United States Patent [19]

Cooper et al.

[11] 4,254,474

[45] Mar. 3, 1981

[54] INFORMATION PROCESSING SYSTEM USING THRESHOLD PASSIVE MODIFICATION

[75] Inventors: Leon N. Cooper; Charles Elbaum, both of Providence, R.I.

[73] Assignee: Nestor Associates, Stonington, Conn.

[21] Appl. No.: 63,071

[22] Filed: Aug. 2, 1979

[51] Int. Cl.³ .......................... G06F 7/38; G05B 13/02
[52] U.S. Cl. .................................... 364/900; 364/715
[58] Field of Search ... 364/200 MS File, 900 MS File, 364/715

[56] References Cited

U.S. PATENT DOCUMENTS

| 3,435,422 | 3/1969 | Gerhardt et al. | 364/900 |
| 3,440,617 | 4/1969 | Lesti | 364/900 |
| 3,950,733 | 4/1976 | Cooper et al. | 364/900 |
| 4,044,243 | 8/1977 | Cooper et al. | 364/715 |
| 4,164,025 | 8/1979 | Dubnowski et al. | 364/900 |

*Primary Examiner*—Harvey E. Springborn
*Attorney, Agent, or Firm*—Karl F. Milde, Jr.

[57] ABSTRACT

An adaptive information processing system includes input terminals adapted to receive N input signals $s_1, s_2, \ldots s_N$ representing an "input"; output terminals adapted to present n output responses $r_1, R_2, \ldots r_n$ representing a "response"; and information processing apparatus, connecting the input with the output terminals, and operative to carry out the processing steps required to "map" different inputs into responses in accordance with a particular passive modification algorithm. This algorithm permits the recognition of unknown inputs and separates inputs which are in different classes but which are originally close to one another.

22 Claims, 10 Drawing Figures

INFORMATION PROCESSING SYSTEM USING THRESHOLD PASSIVE MODIFICATION

BACKGROUND OF THE INVENTION

The present invention relates to an adaptive information processing system; that is, the invention concerns a self-organizing apparatus or process for "mapping" an input into an output response, which output response may vary over time, notwithstanding the presence of the same input, as the system "learns" or is "trained." In particular, the invention relates to a new form of passive modification or self-organizing optimal mapping wherein inputs which are in different classes are separated concurrently with the passive learning of the system.

Our U.S. Pat. No. 3,950,733 issued Apr. 13, 1976 discloses an information processing system of the above-mentioned type. This system includes a module, called the Nestor TM adaptive module, which operates to map an input signal into an output response in accordance with a particular algorithm. When operated in a so-called "learning mode," the Nestor adaptive module modifies itself to both "learn" and forget" at desired rates. When operated in a so-called "memory mode," the module neither learns nor forgets but functions as a pure distributed memory.

When in the learning mode, the Nestor adaptive module operates with "passive modification" and can readily achieve the self-organization of a mapping:

$s^1 \rightarrow r^1$
$s^2 \rightarrow r^2$
$s^k \rightarrow r^k$ from the signal space s: $(s^1 \ldots s^k)$ to the response space r: $(r^1 \ldots r^k)$ if $s^1 \ldots s^k$ are orthogonal. If $s^1 \ldots s^k$ are not orthogonal, passive modification can also achieve recognition as well as class formation. However, some additional new feature is required for class separation.

SUMMARY OF THE INVENTION

It is the primary object of the present invention to provide an adaptive information processing system which achieves the purpose of recognizing unknown inputs as well as separating inputs which are in different classes, but which are originally close to one another.

More particularly, it is an object of the present invention to provide an adaptive information processing system which operates to map an input into an output response by so-called "self-organizing optimal mapping".

These objects, as well as other objects which will become apparent in the discussion that follows, are achieved, according to the present invention, by providing an information processing system having input terminals adapted to receive N input signals $s_1, s_2, \ldots s_N$ representing an "input"; output terminals adapted to present n output responses $r_1, r_2, \ldots r_n$ representing a "response"; a plurality of junction elements, called mnemonders, each mnemonder coupling one of the input terminals (input j) with one of the output terminals (output i) and providing a transfer of information from input j to output i in dependence upon the signal $s_j$ appearing at the input j and upon the mnemonder transfer function $A_{ij}$; and apparatus for modifying the transfer function $A_{ij}$ of at least one of the mnemonders, when in a learning mode, in dependence upon the product of at least one of the input signals and one of said output responses.

In accordance with the invention, the modifications to the transfer function $A_{ij}$, in a learning mode, take the form:

$$A_{ij}(t) = \gamma A_{ij}(t-1) + \delta A_{ij}(t) \qquad (1)$$

where $\delta A_{ij}(t)$ has the form:

$$\delta A_{ij}(t) = \eta(r_i) r_i s_j \qquad (2)$$

where $\eta(r_i)$ is a function of the output, $r_i$. If this function is larger than zero for $r_i \geq \theta_M$, where $\theta_M$ is the modification threshold, and smaller than zero for $r_i < \theta_M$ we achieve threshold passive modification (TPM). In a specific, preferred example:

$$\delta A_{ij}(t) = \pm \eta^{\pm} r_i s_j(t). \qquad (3)$$

In the above equations $A_{ij}(t)$ is the new (modified) transfer function, $A_{ij}(t-1)$ is the previous transfer function, $\gamma$ is a decay constant in the range $0 \leq 1$ and $\eta$ is a variable learning constant. In equation (3) $\eta$ is greater or equal to zero having one value $\eta^-$ if $r_i$ is less than a given threshold value $\theta_M$ and another value $\eta^+$ if $r_i$ is greater than the threshold value $\theta_M$. $\eta^-$ and $\eta^+$ may, but need not be equal. In addition, $\theta_M$ may be varied; for example, $\theta_M$ may depend on the output $r_i$.

Preferably, the information processing system according to the invention includes logic elements, connected between each output terminal and the mnemonders coupled thereto for receiving the mnemonder outputs $s_j'$, and producing an output response $r_i$ proportional to the sum of the mnemonder outputs. That is:

$$r_i = \sum_{j=1}^{N} s_j'$$

As described in our U.S. Pat. No. 3,950,733 and in accordance with the present invention, the modification of the transfer functions $A_{ij}$ may be varied, for example by varying the decay constant $\gamma$ and/or the learning constant $\eta$. In particular, the modifications to $A_{ij}$ may be reduced to zero so that the information processing system operates as a pure distributed memory which neither "learns" nor "forgets." Since, in this case, each individual output response $r_i$ produced by the system is a function of a plurality of transfer functions $A_{ij}$ as well as a plurality of input signals $s_j$, the system memory is not vulnerable to partial damage as is the case with conventional storage devices.

While the present invention is described in terms of apparatus, it will be understood that the invention also concerns and resides in the process executed by such apparatus.

Threshold Passive Modification

Considering now the theoretical basis of the present invention, in passive modification we have $$M(t+1) = \gamma M(t) + \gamma \eta M(t) s(t+1) \times s(t+1),$$

where M is the mapping being modified and s is the input signal. In Threshold Passive Modification (TPM) we focus attention on the output of a single nouveron (call it i) so that we become interested in the $i^{th}$ row of the matrix, M, which is a vector (call it m)

$$M_{ij} = \begin{pmatrix} m_{11} & m_{12} & \cdots \\ m_{21} & m_{22} & \cdots \\ \cdots & \cdots & \cdots \\ m_{i1} & m_{i2} & \cdots & m_{ij} \\ \cdots & \cdots & \cdots \end{pmatrix}$$

Ordinary passive modification in this notation would be written:

$$m_j(t+1) = m_j(t) + \eta\gamma[m(t)\cdot s(t+1)]s_j(t+1)$$

If the $i^{th}$ nouveron is near threshold then the modification becomes:

$$m_j(t+1) = \gamma m_j(t) + \eta P[\gamma m(t)\cdot s(t+1)]s_j(t+1)$$

wherein $$P[x] = x; \quad x \geq \theta_F$$
$$= 0; \quad x < \theta_F,$$

where $\eta_F$ is the "firing" threshold.

It is possible to insert an upper saturation limit at the same time by modifying $P[x]$ to be $$p[x] = x; \quad \mu > x > \theta_F$$
$$= 0; \quad x > \mu, x < \theta_F$$

Threshold Passive Modification is defined as follows: Let $\theta_M$ be the modification threshold. Assume $\theta_M \geq \theta_F$ (a possible variation would allow $\theta_M$ to be smaller than $\theta_F$). Then:

$$m_j(t+1) = \gamma m_j(t) = \eta P_{TPM}k \; [\gamma m(t)\cdot s(t)]s_j(t+1),$$

wherein $$P_{TPM}[x] = -\frac{\eta^-}{\eta} x; \quad x < \theta_M$$
$$= +\frac{\eta^+}{\eta} x; \quad \mu > x > \theta_M$$
$$= 0 \quad x > \mu.$$

The $\eta^-$ and $\eta^+$ are introduced to allow the possibility that the constants are different above and below $\eta_M$. When $\eta_M = \eta_F$ we have what can be called "force-no-fire." Another natural value for $\theta_M$ is just the level of spontaneous activity—the dividing point between positive and negative output.

The $\eta^+$ and $\eta^-$ do not have to be constant. For example, if $$\eta^+ = \text{constant } [\frac{\mu}{\text{output}} - 1]$$
$$= \text{constant } [\frac{\mu}{m(t)\cdot s(t+1)} - 1]$$

then above $\theta_M$ the modification goes from its maximum at output $= m(t) s(t+1) = \theta_M$ to zero when output $= \mu$ so that the upper cutoff comes continuously. If desired, $\theta_M$ may be made continuously adjustable.

We thus assume that the modifiability of a mnemonder is dependent on events that occur at different parts of the same nouveron and on the rate at which the nouveron responds: below $\theta_M$, above $\theta_M$ but below the maximum rate $\mu$, and above $\mu$. Not all mnemonders need be modified.

Lateral inhibition between output nouverons can also be included and this contributes also to the separation between classes as previously described.

The input signals and responses (s and r) can be measured from zero activity or from some level of spontaneous activity.

The modification threshold has the effect of increasing the response of a nouveron to an input to which it responds sufficiently strongly while decreasing its response toward the level of spontaneous activity (or to zero) to inputs to which it responds too weakly. It is this which drives the system to an optimal mapping.

DESCRIPTION OF THE PREFERRED EMBODIMENTS

Figure 5:
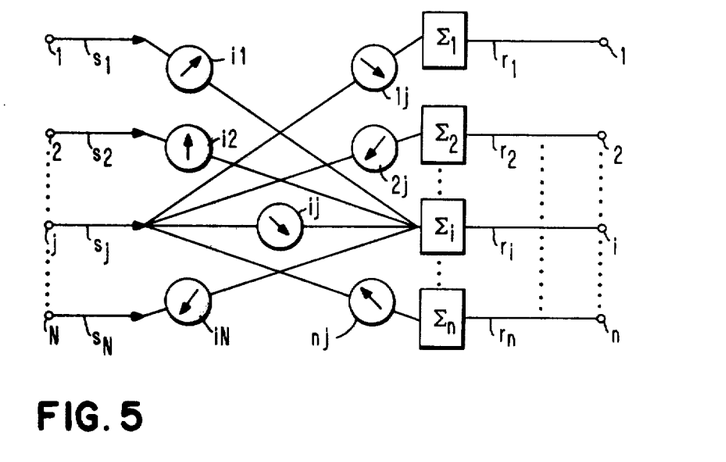
FIG. 5 is a functional block diagram of a Nestor™ adaptive module

FIG. 5 illustrates a Nestor TM adaptive module as is shown and described in our U.S. Pat. No. 3,950,733 issued Apr. 13, 1976. This module is comprised of n nouverons which present n output responses $r_1, r_2, \ldots r_i, \ldots r_n$ at n output terminals $1, 2, \ldots i, \ldots n$, respectively. Each (e.g., the $i^{th}$) nouveron of the module accepts N input signals $s_1, s_2, \ldots s_j, \ldots s_N$ from N input terminals $1, 2, \ldots j \ldots N$, respectively. These input signals are supplied to N mnemonders $i1, i2, \ldots ij, \ldots iN$, as shown, which are all connected to a summer $\Sigma_i$ that produces a nouveron output response $r_i$. Each (e.g., the $ij^{th}$) mnemonder has a transfer function $A_{ij}$; that is, the output of the mnemonder is $$s'_j = A_{ij} s_j \tag{4}$$

where $s_j$ is the input signal supplied to that mnemonder. The output response $r_i$ produced by the summer $\Sigma_i$ is therefore:

$$r_i = \sum_{j=1}^{N} s_j' \qquad (5)$$

Figure 8:
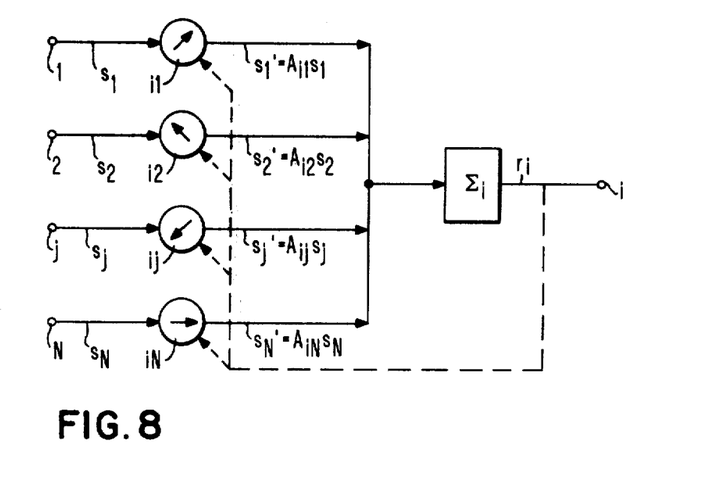
FIG. 8 is a functional block diagram of a nouveron network which is employed in the Nestor TM adaptive module.

The structure of a single nouveron is illustrated in FIG. 8. As is represented there by the dashed line, the output response $r_i$ is fed back to each mnemonder to modify its respective transfer function $A_{ij}$. In the algorithm according to the present invention, the modifications to each transfer function $A_{ij}$ are of the following form:

$$A_{ij}(t) = \gamma A_{ij}(t-1) + \delta A_{ij}(t) \qquad (6)$$

where $\delta A_{ij}(t)$ has the form:

$$\delta A_{ij}(t) = \eta(r_i) r_i s_j \qquad (7)$$

where $\eta(r_i)$ is a function of the output, $r_i$. If this function is larger than zero for $r_i \leq \theta_M$, where $\theta_M$ is the modification threshold, and smaller than zero for $r_i < \theta_M$ we achieve threshold passive modification (TPM). In a specific, preferred embodiment:

$$\delta A_{ij}(t) = \pm \eta^{\pm} r_i s_j(t) \qquad (8)$$

In the above equations $A_{ij}(t)$ is the new (modified) transfer function, $A_{ij}(t-1)$ is the previous transfer function, $\gamma$ is a decay constant in the range $0 \leq \gamma \leq 1$ and $\eta$ is a variable learning constant. In equation (8) $\eta$ is greater or equal to zero having one value $\eta^-$ if $r_i$ is less than a given threshold value $\theta_M$ and another value $\eta^+$ if $r_i$ is greater than the threshold value $\theta_M$. In accordance with the invention $\eta^-$ and $\eta^+$ may, but need not be equal and $\theta_M$ may be varied. For example, $\theta_M$ may depend on the output $r_i$.

As a result of these modifications to $A_{ij}$, wherein $\eta$ is a function of $r_i$ and, in particular, has one value when $r_i$ is above a modification threshold $\theta_M$ and another value when $r_i$ is below, the ability of the system to "learn" and "forget" may be made dependent upon the system response. Thus, for example, system responses which are greater than the "watershed" value $\theta_M$ may be reinforced (learning) and responses which are less than this value may be suppressed (unlearning or forgetting).

Before considering the preferred embodiments of the present invention, it may be useful to consider several computer simulations which illustrate the effects of the present invention described above. In these simulations a portion of the mnemonders has not been modified, nonetheless the modified mnemonders bring the system to its optimal condition.

Figure 1A:
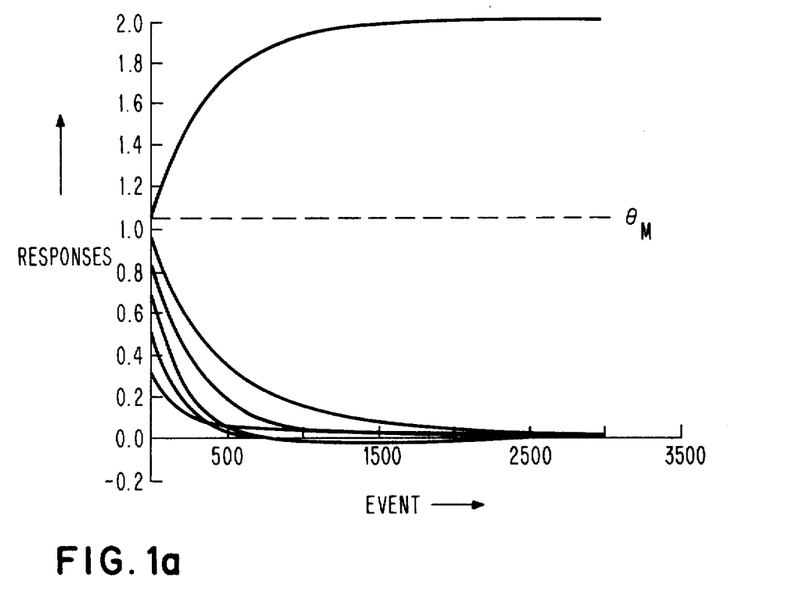
FIGS. 1a and 1b are diagrams showing the responses of a nouveron to seven different noiseless patterns as a function of time.
Figure 1B:
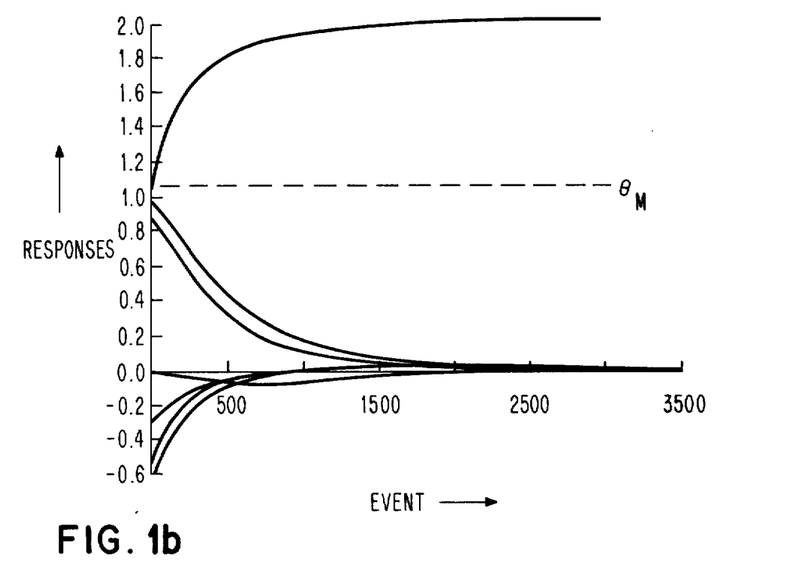

FIGS. 1a and 1b illustrate the responses of a nouveron to seven different noiseless patterns as a function of time. All noise levels, in this case, were zero. The individual patterns were entered in a pseudorandom order such that within each set of steps in the algorithm, each pattern was entered once but otherwise in a random sequence. The response to the leading pattern was made higher than $\theta_M$, whereas the responses to the other six patterns were lower. In FIG. 1a all of the initial responses of the nouveron to the input pattern were positive; in FIG. 1b some of the initial responses of the nouveron were negative. The only difference between FIG. 1a and FIG. 1b, therefore, is in the value of m(0).

Figure 2:
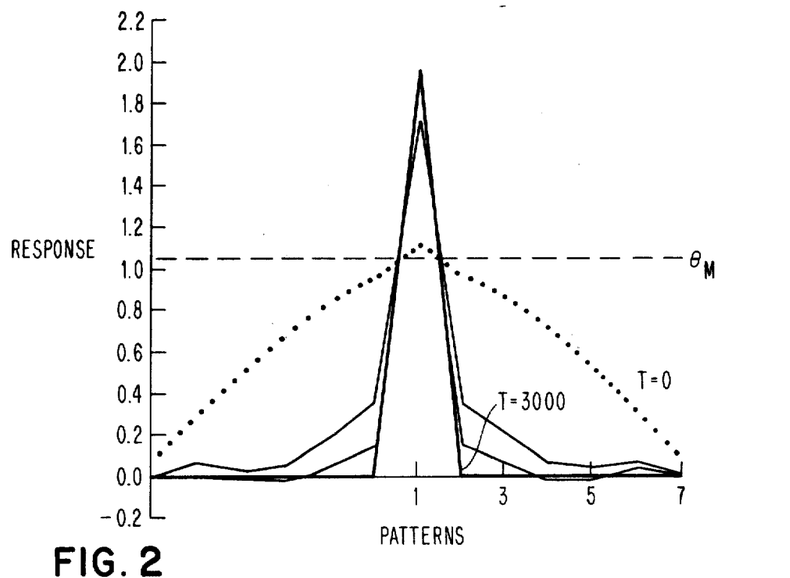
FIG. 2 is a diagram showing the responses of a nouveron to seven different noiseless patterns at intervals of time from $t=0$ to $t=3000$.

FIG. 2 shows the responses of a nouveron to seven different noiseless patterns at intervals from $t=0$ to $t=3000$. This simulation is the same as that shown in FIG. 1a. The responses of the nouveron to patterns on the left side of pattern 1 were set equal to responses to the corresponding pattern on the right. This gives a symmetrical "tuning curve" to correspond to an actual simulation having thirteen patterns.

Figure 3:
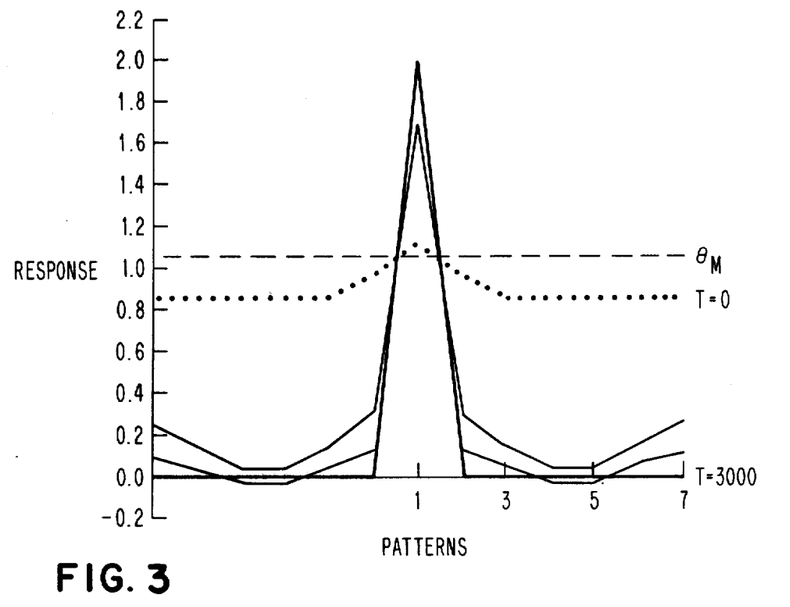
FIG. 3 is a diagram showing the responses of a nouveron to seven different noiseless patterns at intervals from $t=0$ to $t=3000$. This exemplary simulation is identical to that of FIG. 2 except that m(0) is chosen to make the initial responses of the nouveron relatively flat.

FIG. 3 shows the responses of a nouveron to seven different noiseless patterns. This simulation is identical to that of FIG. 2 except that m(0) was chosen to make the initial responses of the nouveron relatively flat.

Figure 4:
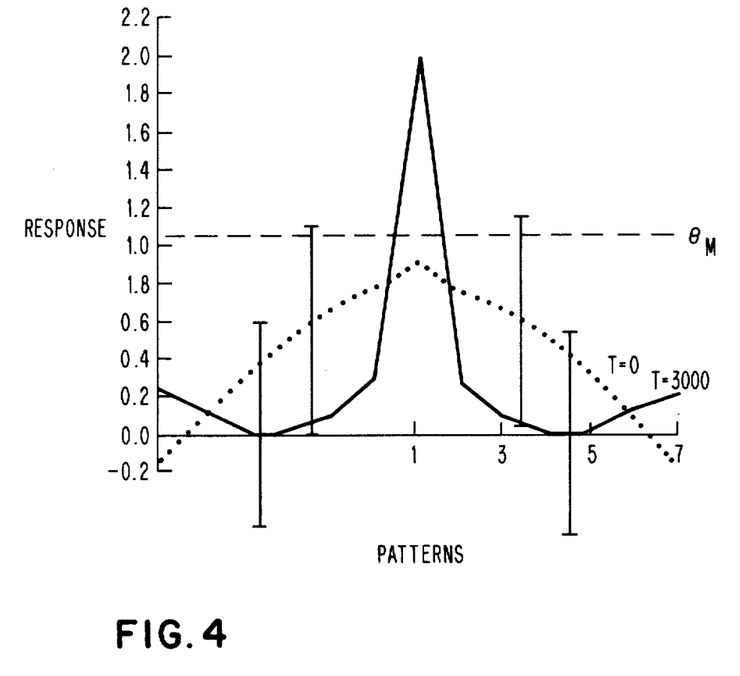
FIG. 4 is a diagram showing the responses of a nouveron to seven different patterns at intervals from $t=0$ to $t=3000$. In this simulation, the input signals are patterns with noise.

FIG. 4 shows the responses of a nouveron to seven different patterns with noise at times $t=0$ and $t=3000$. Channel noise was also present in addition to the signal (pattern) noise, with the two types of noise uncorrelated. As before, the different input patterns were entered in a pseudorandom order. The dotted curve shows the responses at time $t=0$, whereas the solid curve shows responses at time $t=3000$. The vertical bars represent regions, inside which the responses would be if channel noise were added. Therefore, each individual realization of a "tuning curve" would be inside these regions, with the curves giving the average tuning at the respective times $t=0$ or $t=3000$.

Two preferred embodiments of the present invention will now be described in detail with reference to FIGS. 6-10 of the drawings. These embodiments are modified from those disclosed in our U.S. Pat. No. 4,044,243, issued Aug. 23, 1977.

In both preferred embodiments each input signal $s_j$ and output response $r_i$ is represented by a digital number (e.g., an eight-bit binary number), which may be stored or held as long as desired in an appropriate register. Each transfer function $A_{ij}$ is, in this case, a simple multiplier; i.e., it is also a digital (e.g., eight-bit binary) number that is to be multiplied with the number representing the proper input signal $s_j$ to produce still another digital (e.g., eight-bit binary) number representing the output $s'_j$ of the mnemonder. (In the event that a particular product has more than eight digits, the most significant eight bits are chosen.) Thus, we may view the matrix of transfer functions $A_{ij}$ as constituting an array of $N \times n$ digital numbers stored in an active memory of suitable size. In view of this simplifying assumption wherein each transfer function $A_{ij}$ is really a digital multiplier and not a complicated function, these transfer functions are herein denoted as modifiable "weighting numbers."

Figure 6:
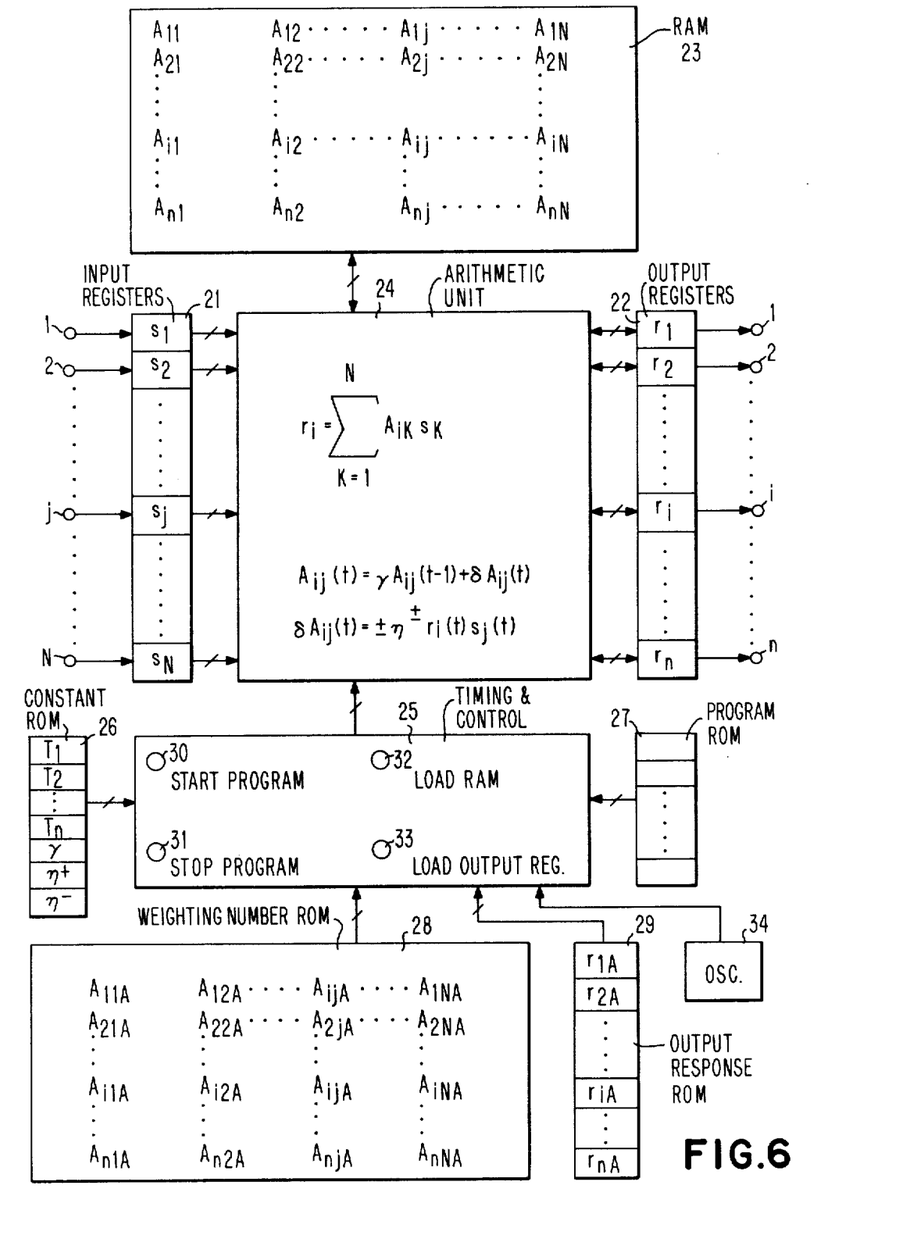
FIG. 6 is a block diagram of a digital, adaptive information processing system in accordance with a first preferred embodiment of the present invention.

FIG. 6 shows the "architecture" of a digital, adaptive information processing system in accordance with a first preferred embodiment of the present invention. This arrangement comprises a set of digital input registers 21, adapted to receive and store N numbers $s_1, s_2, \ldots, s_j, \ldots s_N$ representing the input signal; a set of digital output registers 22, adapted to receive and store n numbers $r_1, r_2, \ldots, r_i, \ldots r_n$ representing the output response; and centrally organized, digital information processing apparatus connecting the input registers 21 with the output registers 22. The information processing system repeatedly carries out the processing steps required to "map" the numbers stored in the input registers into numbers placed in storage in the output registers following the algorithm according to the invention as set forth in equations (1)-(8), above. In the present embodiment, this system is conceived as a large-scale integrated circuit—that is, a micro-miniaturized semiconductor "chip" or plurality of chips—in which the storage, arithmetic and control functions can be physically (spacially) arranged to make efficient use of chip real estate and to facilitate utilization of conventional "off the shelf" circuit components.

Basically, the first embodiment of the invention consists of a centrally organized microprocessor which is structured by software or firmware to carry out the calculations necessary to function in accordance with the abovenoted algorithm. This embodiment is to be contrasted with the second embodiment of the present invention, illustrated in FIGS. 9 and 10 and described hereinbelow, in which the various memory, arithmetic and control elements are spacially distributed throughout the circuit and the functions they perform are "hard wired" into the device.

The centrally organized, adaptive information processing system in accordance with the first embodiment of the present invention may comprise a commercially available microprocessor, such as is generally described for example in Hasson's text *Micro-programming: Principles and Practices* (Prentice-Hall) or it may be constructed of commercially available large-scale integrated (LSI) logic units connected together in a manner such as is illustrated in FIG. 6 using circuit design techniques which are now well known in the art.

The information processing system shown in FIG. 6 comprises a high speed random access memory (RAM) 23 of suitable size to store $N \times n$ weighting numbers $A_{ij}$. For example, if the weighting numbers are eight-bit binary, and if the module is designed to receive one hundred input signals (N=100) and produce one hundred output responses (n=100) then the RAM 23 should be capable of storing 10,000 eight-bit words or "bytes" (if a memory "word" contains more than eight bits). Each word should, of course, include a sign bit because the digital numbers stored and processed may assume negative as well as positive values.

The RAM 23 is connected to receive words from, and to supply words to an arithmetic unit 24. Preferably, the contents of each word are either written into or read out from memory in parallel form. The arithmetic unit 24 is capable of carrying out conventional, mathematical binary logic functions such as addition, multiplication and comparison, under the control of a timing and control unit 25. The arithmetic unit 24 receives the numbers (e.g., eight-bit words) upon which it operates from the input and output registers 21 and 22, from the RAM 23 and from the timing and control unit 25. The arithmetic unit places the results of its computations in the output registers 22 and the RAM 23.

The timing and control unit 25 receives input from four read-only memories:

(1) a ROM 26 for storing constants utilized in the execution of the algorithm;

(2) a ROM 27 for storing the program required to execute the algorithm;

(3) a ROM 28 for storing initial values of the weighting numbers $A_{ij}$; and (4) a ROM 29 for storing fixed values of the output responses $r_i$.

The initial values of the weighting numbers $A_{ij}$ are designated $A_{11A}, A_{12A}, \ldots A_{ijA}, \ldots A_{nNA}$. The fixed values of the numbers representing the output response are designated as $r_{1A}, r_{2A}, \ldots r_{iA}, \ldots r_{nA}$. Read-only memories are used to supply this information because they are inexpensive and because they may be conveniently furnished to users with the stored numbers permanently "burned in."

The timing and control unit 25 is provided with four buttons or "switches" which may be manually set by the operator of the module or automatically controlled by another information processing system:

(1) a switch 30 which, when set, causes the unit to execute the program;

(2) a switch 31 which, when set, causes the unit to halt the execution of the program after determining the number representing the last output response $r_n$;

(3) a switch 32 which, when set, causes the contents of the weighting number ROM 28 to be transferred to the RAM 23; and (4) a switch 33 which, when set, causes the contents of the output response ROM 29 to be loaded into the output registers 22.

The timing and control unit 25 is clocked by an oscillator 34. In response to clock pulses, it receives successive instructions from the program ROM 27, decodes these and applies control signals to the arithmetic unit causing the arithmetic unit to receive and operate on numbers in the manner prescribed.

If an instruction from the program ROM 27 requires that a number located in one of the other ROMs 26, 28 and 29 be transmitted to the arithmetic unit 24, the timing and control unit 25, upon decoding this instruction, applies suitable reading signals to the appropriate ROM to read out the desired number and then passes this number to the arithmetic unit for use during execution of a subsequent instruction.

For example, if it is desired to transfer a weighting number $A_{ij}$ in the ROM 28 to a corresponding address in the RAM 23, the following two instructions may be stored in the program ROM 27:

READ X,
STORE Y;

where X and Y are the addresses of $A_{ijA}$ and $A_{ij}$ in the ROM 28 and RAM 23, respectively. When the timing and control unit 25 decodes the READ X instruction, it applies suitable signals to the ROM 28 to read out $A_{ijA}$ and passes this number in parallel form, to a register or accumulator in the arithmetic unit 24. Thereafter, when the timing and control unit decodes the instruction STORE Y, it applies suitable signals to the arithmetic unit to pass the contents of the register containing $A_{ijA}$ to the proper address for $A_{ij}$ in the RAM 23.

Figure 7:
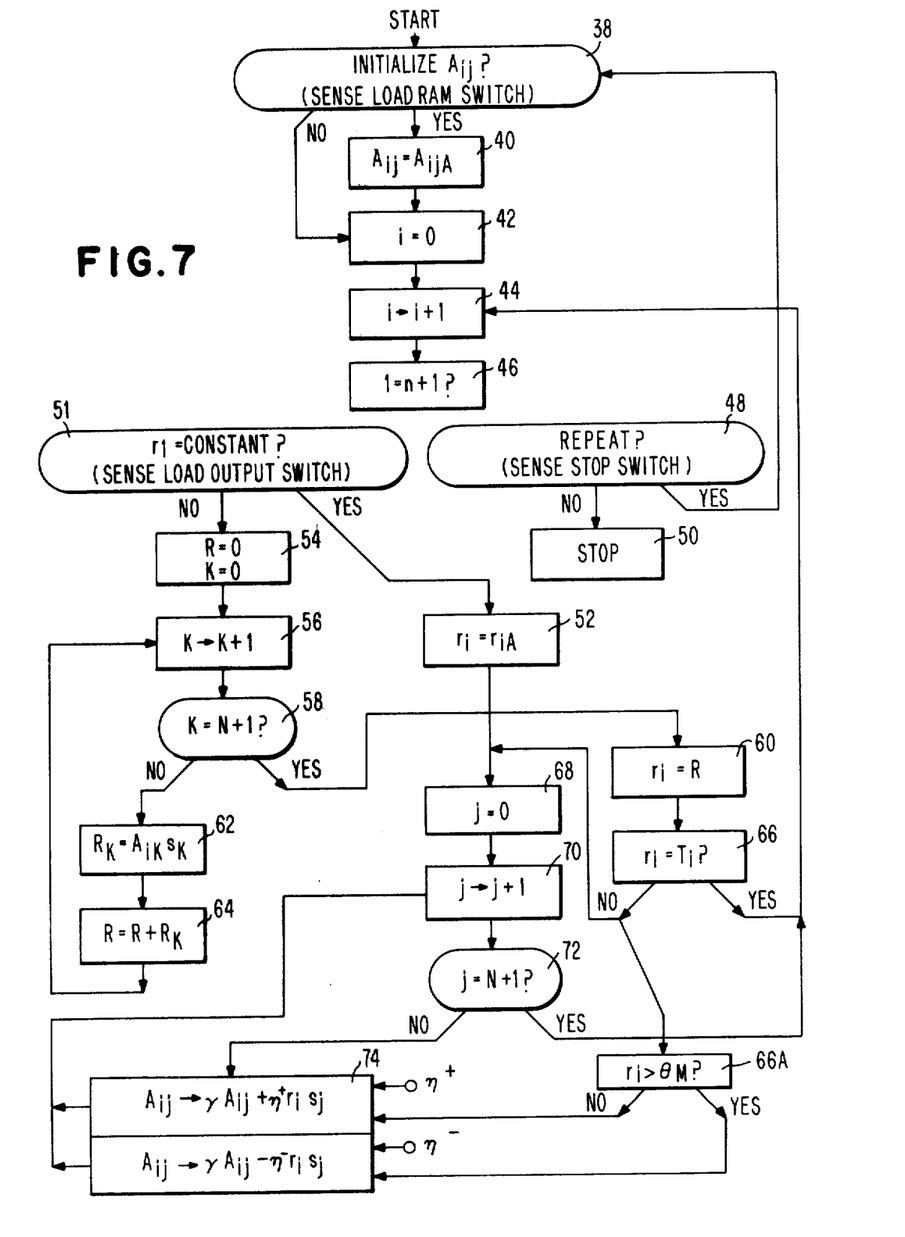
FIG. 7 is a flow chart detailing the operation of the digital information processing system of FIG. 6.

FIG. 7, illustrates, in flow chart form, a program which may be used to cause an information processing system of the type illustrated in FIG. 6 to carry out the algorithm to map the input signal $s_1, s_2, \ldots s_n$ into the output response $r_1, r_2, \ldots r_n$. When the program is started (e.g. by manually pressing the start button 30 on the timing and control unit 25) the load RAM switch 32 is sensed to determine whether the initial values of the weighting numbers $A_{ijA}$ are to be loaded into the RAM 23 (block 38). If so, each of the weighting numbers $A_{ij}$ in the RAM 23 is set equal to its initial value $A_{ijA}$ (block 40); if not, the program proceeds directly to initialize i to zero (block 42). Thereafter, i is increased by one (block 44) and a determination is made as to whether i then exceeds the number (n) of output registers 22 (block 46). If it does, the computations of the numbers $r_1, r_2, \ldots r_n$ representing the output resonse are complete and the program may repeat itself or terminate depending upon the position of the stop switch 31 (block 48). If this switch is activated, the next instruction to be executed is a stop code (block 50); if not, control is returned to the part of the program which senses the load RAM switch (block 38).

If i does not yet exceed n, the load output switch is sensed (block 51) to determine whether the numbers in the output registers 22 should be set equal to the values $r_{1A}, r_{2A} \ldots r_{nA}$ stored in the ROM 29. If so, these numbers are directly transferred (block 52); if not, each number representing an output response $r_i$ is calculated as follows:

Two variables R and k which are used in the calculation are first initialized by setting them equal to zero (block 54). k is then incremented by one (block 56) and it is determined whether k then exceeds the number of input signals N (block 58). If so, the number $r_i$ representing the $i^{th}$ output response is set equal to R, which has been previously calculated, and this number is stored in the appropriate one of the output registers 22 (block 60). If k is less than or equal to N, the number stored in the $k^{th}$ input register 21 is multiplied by the weighting number $A_{ik}$ stored in the RAM 23 to give the product which is an intermediate variable $R_k$ (block 62). Thereafter, this intermediate variable $R_k$ is added to the stored value R to update the value R (block 64). As a result, when k finally exceeds N, R is the accumulated sum of $A_{ik}s_k$ for all k from 1 to N.

After each number representing an output response $r_i$ is calculated, it is compared with a constant threshold value $T_i$ (block 66) to determine whether the threshold has been reached. If so, the program is redirected to the point (block 44) where i is incremented; if not, the signal $r_i$ is sent to two locations. In one location (block 66A) $r_i$ is compared with the threshold $\theta_M$. In the other location (block 68) $r_i$ causes the value of j to be initialized by setting it equal to zero and then incrementing it by adding one (block 70). Thereafter it is determined whether the value of j exceeds the total number of input signals N (block 72). If so, the modifications to $A_{ij}$ are completed and the value of i is incremented by one (block 44). If not, the weighting number $A_{ij}$ stored in the RAM 23 is multiplied by the parameter $\gamma$, the current numbers representing $r_i$ and $s_j$ are multipllied together and the product of these last two numbers is multiplied either by the parameter $\eta^+$ if $r_i > \theta_M$ or $\eta^-$ if $r_i < \theta_M$ and the resulting product is respectively added to or subtracted from the product of $\gamma$ and $A_{ij}$. The sum produced by this addition or subtraction is the new $A_{ij}$, which is then stored at the appropriate address in the RAM 23 (block 74). After this modification to the weighting number $A_{ij}$ is made, the value j is again incremented by one (block 70) and the process is repeated.

The program described by the flow chart shown in FIG. 7 may be written using well known programming techniques in any language that is understandable by the particular information processing system employed. It will be understood that the generation of such a program from the flow chart of FIG. 7 would require no more than routine skill in the software art.

From the discussion above, it will be appreciated that the centrally organized information processing system forming the first embodiment of the present invention employs conventional hardware which is programmed in a specific manner to execute the algorithm according to the invention. This system makes efficient use of chip real estate and, because of the lack of redundant elements, may be low in cost.

Figure 9:
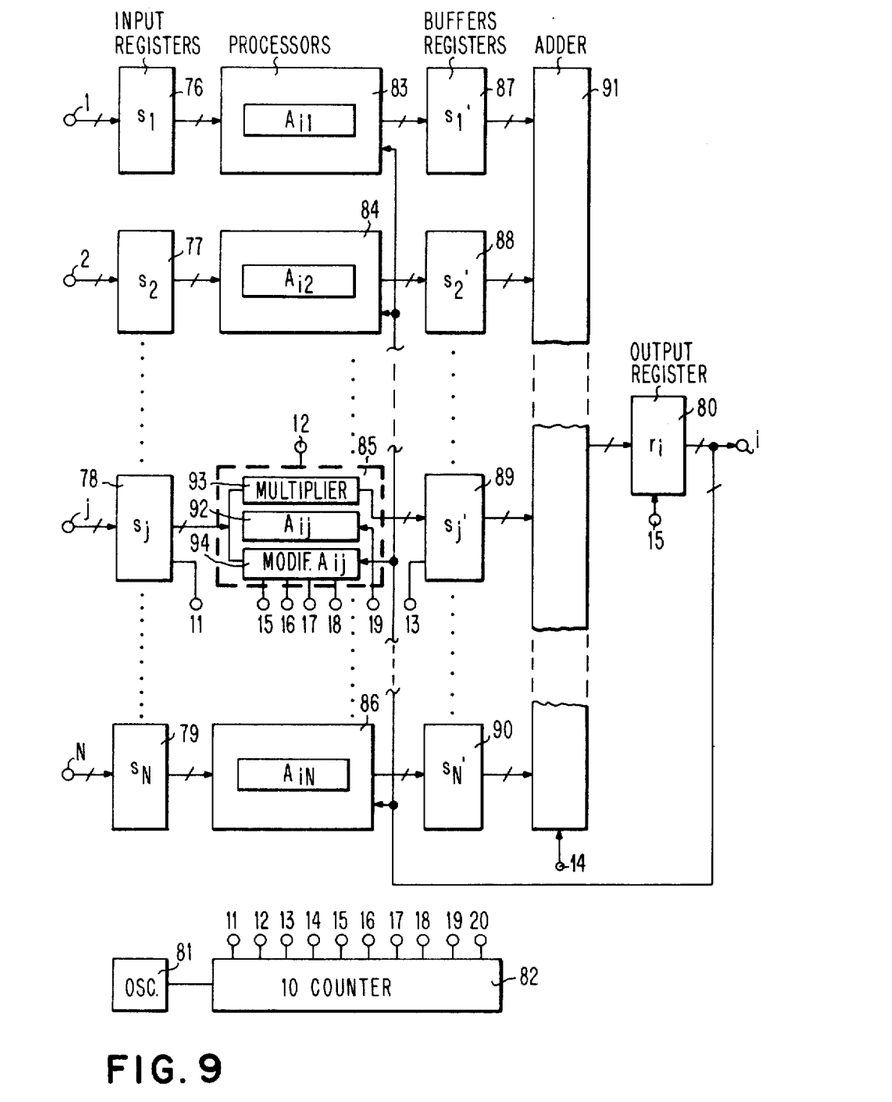
FIG. 9 is a block diagram of a digital nouveron network in accordance with a second preferred embodiment of the present invention.
Figure 10:
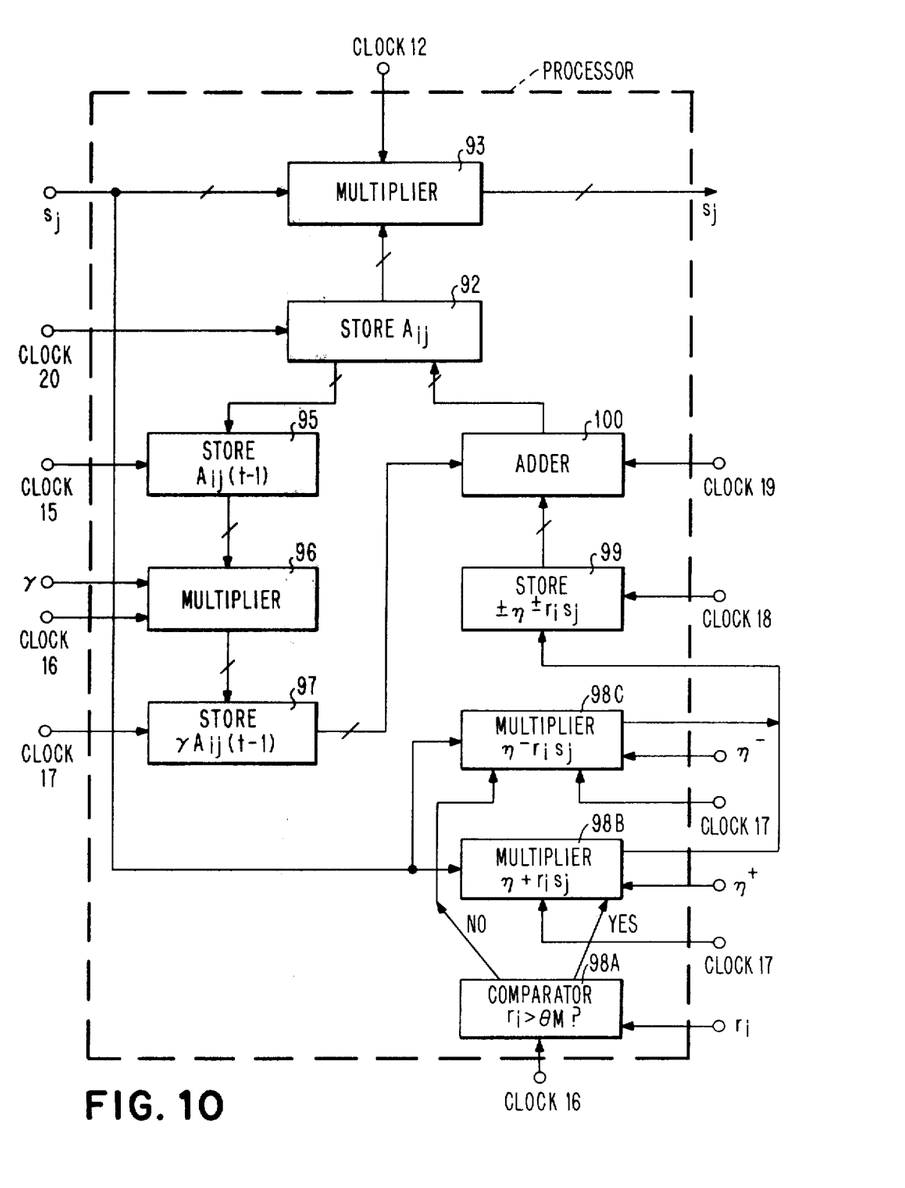
FIG. 10 is a block diagram illustrating a typical processor in the embodiment of FIG. 9.

FIGS. 9 and 10, which will now be described, illustrate a portion of a distributed information processing system in accordance with a second preferred embodiment of the present invention. Unlike the first embodiment described in connection with FIGS. 6 and 7, this second embodiment exhibits a high degree of structural redundancy, requiring a far greater number of circuit elements than the first embodiment for a given number N of input signals and a given number n of output responses. Notwithstanding this increased number of elements, however, this second embodiment of the present invention may actually cost less to produce in large-scale integrated circuit form than the first embodiment illustrated in FIGS. 6 and 7 and described above. In particular, while the first embodiment of the present invention requires that virtually every logic circuit element function properly for the information processing system to operate at all, the second embodiment takes advantage of the self-organizing nature of the Nestor TM adaptive module with the result that the system works well even when a portion of the physical structure is inoperative. This ability of the second embodiment to adapt to partially inoperative structure may be an important advantage in the manufacture of large-scale integrated circuits since the "yield" of circuits in which all of the circuit elements operate properly is something less than 100 percent.

Therefore, whereas the first embodiment of the adaptive information processing system is centrally organized and possesses a minimum number of redundant circuit elements, the second embodiment may be characterized as a spacially distributed system with a high degree of redundancy.

FIGS. 9 and 10 illustrate a nouveron network that closely corresponds to the nouveron network illustrated functionally in FIG. 8. It will be understood that this network of FIG. 8 constitutes a part of the Nestor TM adaptive module which is illustrated functionally in FIG. 5. Thus, an entire system constructed in accordance with the second preferred embodiment of the present invention will require n nouverons of the type illustrated in FIGS. 9 and 10.

The circuit of FIG. 9 comprises N input registers 76, 77, 78 and 79 adapted to receive numbers representing input signals $s_1, s_2 \ldots, s_j \ldots, s_N$ from the input terminals 1, 2, ... j ... N, respectively. The numbers may be supplied to the input registers in either serial or parallel form. Parallel inputs are indicated in FIG. 9 by the convention "/". As is illustrated for the input register 78, each input register has a gating input connected to a clock terminal 11. When a clock pulse is applied to this terminal 11, the input registers store the numbers supplied thereto from their respective input terminals.

Similarly, the device of FIG. 9 is provided with an output register 80 adapted to store a number representative of the output response $r_i$. This output register has a gating input which accepts a clock pulse from terminal 15 causing the contents of the register to change in accordance with the signals appearing at the register inputs.

Clock pulses are supplied in the circuit of FIG. 9 by an oscillator 81 and counter 82. The counter 82 has ten clock output terminals 11-20 which are successively and repeatedly activated.

The numbers stored in the input registers 76, 77, 78 and 79 are mapped into a number stored at the output register 80 by means of a plurality of processors 83, 84, 85 and 86, buffer registers 87, 88, 89 and 90 and an adder 91. As is shown in detail within the processor 85, each processor contains a register 92 for storing a weighting number $A_{ij}$, a multiplier 93 which receives inputs from the associated input register 78 and the storage register 92, and a device 94 for modifying the contents $A_{ij}$ of the storage register 92.

The multiplier 93 in the processors 83, 84, 85 and 86 are operative when gated by a clock pulse appearing at the clock terminal 12 to multiply the number in the associated input register representative of the input signals $s_j$ by the weighting number $A_{ij}$ stored in the register 92. The product of these two numbers is stored in the associated one of the buffer registers 87, 88, 89 and 90 upon receipt of a gating pulse appearing at the clock terminal 13. Thereafter, all of the numbers stored in the buffer registers 87, 88, 89 and 90 are added together by the adder 91 upon receipt of a gating pulse at the clock terminal 14. The sum of these numbers is presented to the output register 80 and stored therein when the register 80 receives a gating pulse from the clock terminal 15.

After the number in the output register 80 has been updated, the weighting number $A_{ij}$ in the storage register 92 of each processor 83, 84, 85 and 86 is modified in accordance with the equations (3) and (4) given above. This modification to $A_{ij}$ is accomplished by a device 94 that is shown in greater detail in FIG. 10.

The processor illustrated in FIG. 10 includes a storage register 95, multiplier 96, storage register 97, comparator 98, multipliers 98B and 98C, storage register 99 and adder 100, in addition to the storage register 92 and multiplier 93 referred to above. Each of the elements 95–100 is connected to an appropriate clock terminal so that the calculation may be coordinated by the counter 82.

In operation, the weighting number $A_{ij}$ found in the storage register 92 is clocked into the register 95 and multiplied in the multiplier 96 by the constant $\gamma$. Thereafter, the product $\gamma A_{ij}(t-1)$ is read into the buffer register 97 by a gating pulse at the clock terminal 17.

The comparator 98A, upon receiving the clock signal 16 compares $r_i$ with $\theta_M$. When $r_i > \theta_M$, $r_i$ is channeled toward multiplier 98B where, upon receiving the clock signal 17, it is multiplied by $\eta^+$ and by $s_j$ to yield the product $\eta^+ r_i s_j$. This product is gated into the buffer register 99 when the clock pulse appears at terminal 18. When $r_i > \theta_M$, $r_i$ is channeled toward multiplier 98C where, upon receiving the clock signal 17 (note that clock signal 17 appears at both multipliers 98B and 98C) it is multiplied by $\eta^-$ and by $s_j$ to yield the product $\eta^- r_i s_j$. As for the product $\eta^+ r_i s_j$, $\eta^- r_i s_j$ is gated into the buffer register 99 when the clock pulse appears at terminal 18.

The parameters $\gamma$, $\eta^+$ and $\eta^-$, which are supplied to registers 96, 98B and 98C in parallel form, may originate from separate registers or from sets of independently operated switches. The threshold $\theta_M$ supplied to comparator 98A may, likewise, originate in a separate register or switch and may be continuously adjustable.

Finally, the numbers stored in the buffer registers 97 and 99 are added together by the adder 100 when a gating pulse appears at the clock terminal 19. This sum is read into the storage register 92, completing the modification to the weighting number $A_{ij}$, when a pulse appears at the clock terminal 20.

It will be understood that the above-described embodiments are merely exemplary, and that persons skilled in the art may make many variations and modifications thereto without departing from the spirit and scope of the present invention. Accordingly, it is intended that all such modifications and variations be included within the scope of the invention as defined in the appended claims.

We claim:

1. An information processing system comprising, in combination:
   a. a plurality (n) of input terminals 1, 2 ..., j ..., N adapted to receive N input signals $s_1, s_2 ..., s_j ..., s_N$, respectively;
   b. a plurality (n) of output terminals 1, 2 ..., i ..., n adapted to present n output responses $r_1, r_2 ..., r_i ..., r_n$, respectively;
   c. a plurality of junction elements, called mnemonders, each mnemonder coupling one of said input terminals (input j) with one of said output terminal (output i) and providing a transfer of information from input j to output i in dependence upon the signal $s_j$ appearing at the input j and upon the mnemonder transfer function $A_{ij}$; and
   d. means for modifying the transfer function $A_{ij}$ of at least one of said mnemonders, when in a learning mode, in dependence upon the product of at least one of said input signals and one of said output responses;

wherein modifications to the transfer functions of the mnemonders, when in a learning mode, take the form:

$$A_{ij}(t) = \gamma A_{ij}(t-1) + \delta A_{ij}(t)$$

where $\delta A_{ij}(t)$ has the form:

$$\delta A_{ij}(t) = \eta(r_i) r_i s_j$$

where $A_{ij}(t)$ is the new (modified) transfer function, $A_{ij}(t-1)$ is the previous transfer function, $\gamma$ is a decay constant in the range $0 \leq \gamma \leq 1$ and $\eta$ is a variable learning constant that is dependent upon the output $r_i$.

2. The information processing system defined in claim 1, further comprising logic element means, connected between each output terminal and the mnemonders coupled thereto, for receiving mnemonder outputs $s_j'$ and producing an output response $r_i$ in dependence upon said mnemonder outputs.

3. The information processing system defined in claim 2, wherein each of said logic element means produces said output response $r_i$ in proportion to the sum of the mnemonder outputs $s_j'$ applied thereto:

whereby said output response $r_i$ takes the form:

$$r_i = \sum_{j=1}^{N} s_j'.$$

4. The information processing system defined in claim 1, wherein said modifying means includes means for changing all (n×N) of said transfer functions $A_{11}, A_{12}, ... A_{21}, A_{22}, ... A_{nN}$ in accordance with said formulae for $A_{ij}(t)$.

5. The information processing system defined in claim 1, wherein said modifying means includes means for varying the modification of said transfer functions $A_{ij}$.

6. The information processing system defined in claim 5, wherein said modification varying means includes means for reducing the modification of said transfer functions $A_{ij}$ to zero, whereby said information processing system operates as a distributed memory.

7. The information processing system defined in any one of claims 1-6 wherein $\eta$ is larger than zero for $r_i \leq \theta_M$, where $\theta_M$ is the modification threshold, and smaller than zero for $r_i < \theta_M$.

8. The information processing system defined in claim 7 wherein $\delta A_{ij}(t)$ has the form:

$$\delta A_{ij}(t) = \pm \eta^{\pm} r_i s_j(t)$$

where $\eta$ is greater or equal to zero having one value $\eta^-$ if $r_i$ is less than said threshold value $\theta_M$ and another value $\eta^+$ if $r_i$ is greater than said threshold value $\theta_M$.

9. The information processing system defined in claim 8, wherein $\eta^-$ and $\eta^+$ are equal.

10. The information processing system defined in claim 8, wherein $\eta^-$ and $\eta^+$ are unequal.

11. The information processing system defined in claim 7, wherein $\theta_M$ is a variable quantity.

12. The information processing system defined in claim 11 wherein $\theta_M$ is a function of the output, $r_i$.

13. A method of processing information comprising the steps of:
 a. receiving a plurality of input signals $s_1, s_2 \ldots, s_j \ldots, s_N$,
 b. producing a plurality of intermediate signals $s'_{i1}, s'_{i2}, \ldots s'_{ij} \ldots, s'_{iN}$, each $s'_{ij}$ of which is dependent upon a respective one of said input signals $s_j$ and an associated transfer function $A_{ij}$;
 c. producing an output response $r_i$ which is dependent upon at least one of said intermediate signals $s'_{ij}$; and
 d. modifying at least one of said transfer functions $A_{ij}$, when in a learning mode, according to the formula:

$$A_{ij}(t) = \gamma A_{ij}(t-1) + \delta A_{ij}(t)$$

where $\delta A_{ij}(t)$ has the form:

$$\delta A_{ij}(t) = \eta(r_i) r_i s_j(t)$$

where $A_{ij}(t)$ is the new (modified) transfer function, $A_{ij}(t-1)$ is the previous transfer function, $\gamma$ is a decay constant in the range $0 \leq \gamma \leq 1$ and $\eta$ is a variable learning constant that is dependent upon the output $r_i$.

14. The method defined in claim 13, wherein said output response $r_i$ takes the form:

$$r_i = \sum_{j=1}^{N} s'_j.$$

15. The method defined in claim 13, wherein said modifying step includes changing all $(n \times N)$ of said transfer functions $A_{11}, A_{12}, \ldots A_{21}, A_{22}, \ldots A_{nN}$ in accordance with said formula for $A_{ij}(t)$.

16. The method defined in claim 13, wherein said modifying step includes varying the modification of said transfer functions $A_{ij}$.

17. The method defined in any one of claims 13-16 wherein $\eta$ is larger than zero for $r_i \leq \theta_M$, where $\theta_M$ is the modification threshold, and smaller than zero for $r_i < \theta_M$.

18. The method defined in claim 17 wherein $\delta A_{ij}(t)$ has the form:

$$\delta A_{ij}(t) = \pm \eta^{\pm} r_i s_j(t)$$

where $\eta$ is greater or equal to zero having one value $\eta^-$ if $r_i$ is less than said threshold value $\theta_M$ and another value $\eta^+$ if $r_i$ is greater than said threshold value $\theta_M$.

19. The method defined in claim 18, wherein $\eta^-$ and $\eta^+$ are equal.

20. The method defined in claim 18, wherein $\eta^-$ and $\eta^+$ are unequal.

21. The method defined in claim 17, wherein $\theta_M$ is a variable quantity.

22. The method defined in claim 21 wherein $\theta_M$ is a function of the output, $r_i$.

* * * * *